May 28, 1968          L. C. BANCROFT ETAL          3,385,951
APPARATUS FOR PERFORATING AND BONDING MOVING SHEETS
OF MATERIAL BY ELECTRICAL DISCHARGES
Filed May 20, 1966                              4 Sheets-Sheet 1
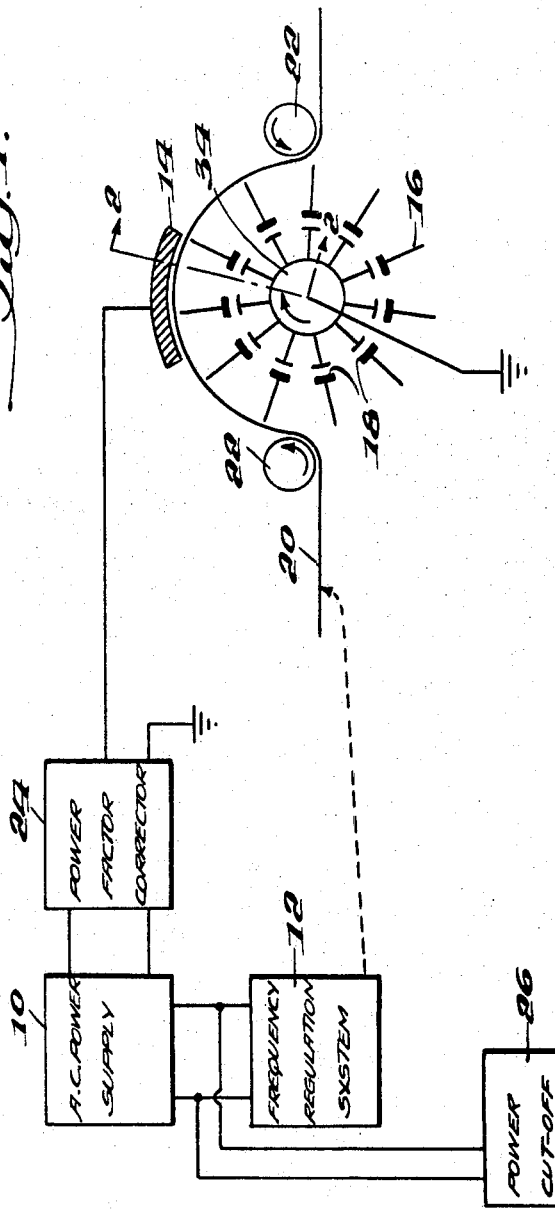
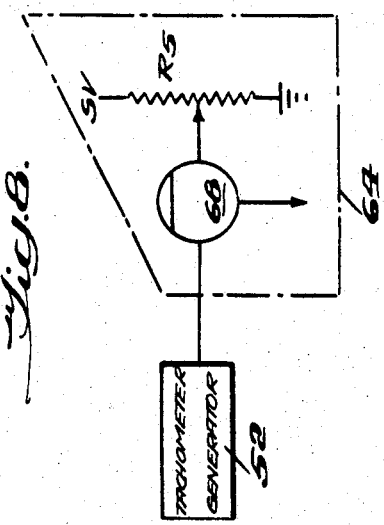
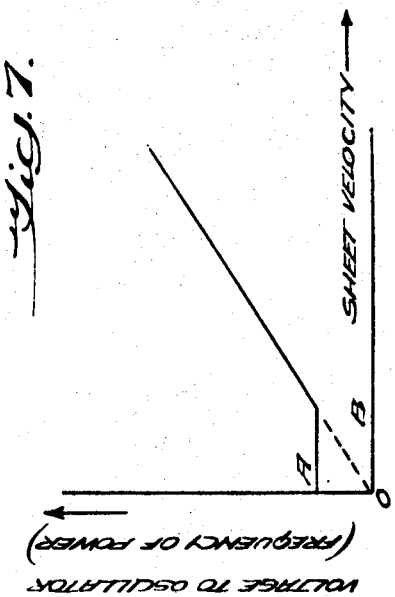

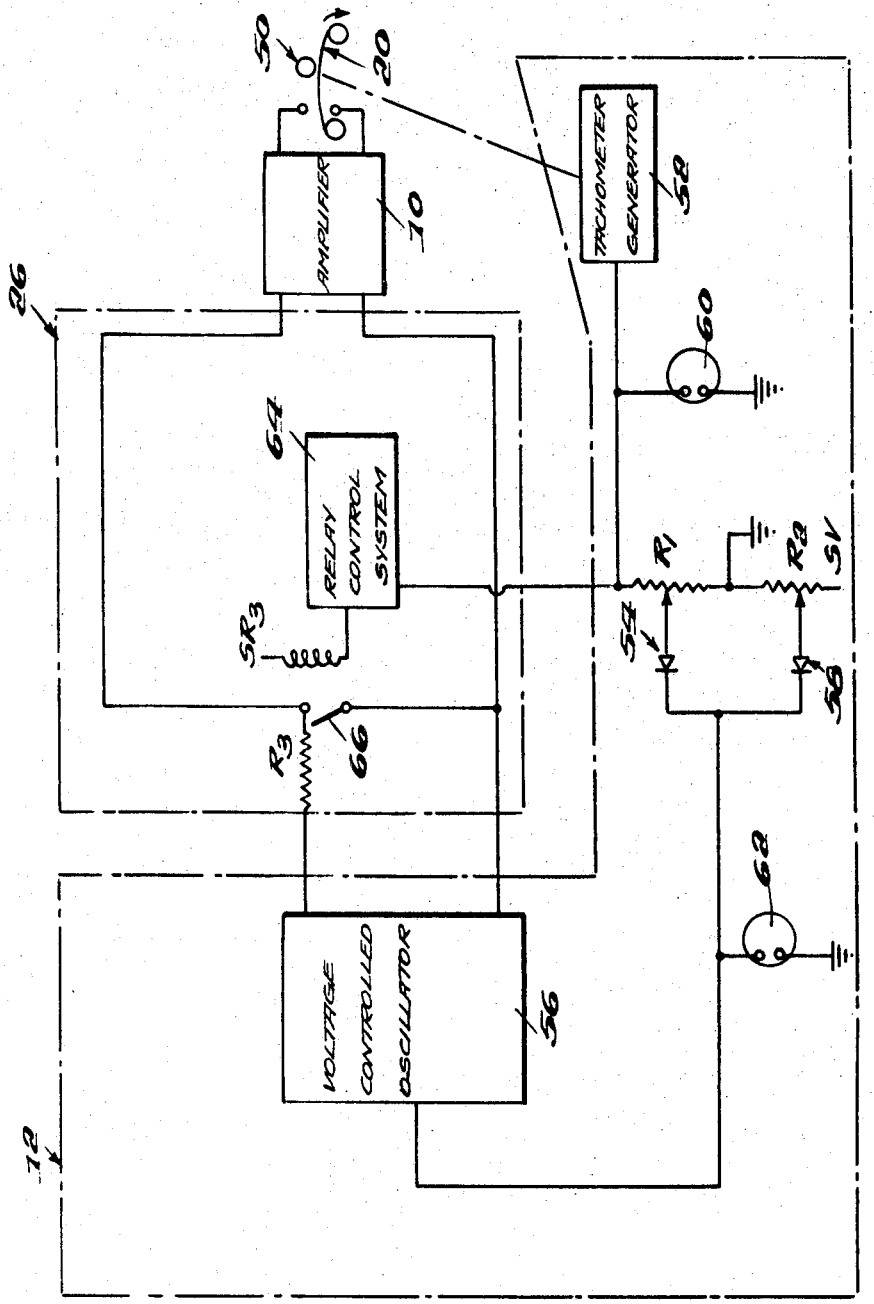

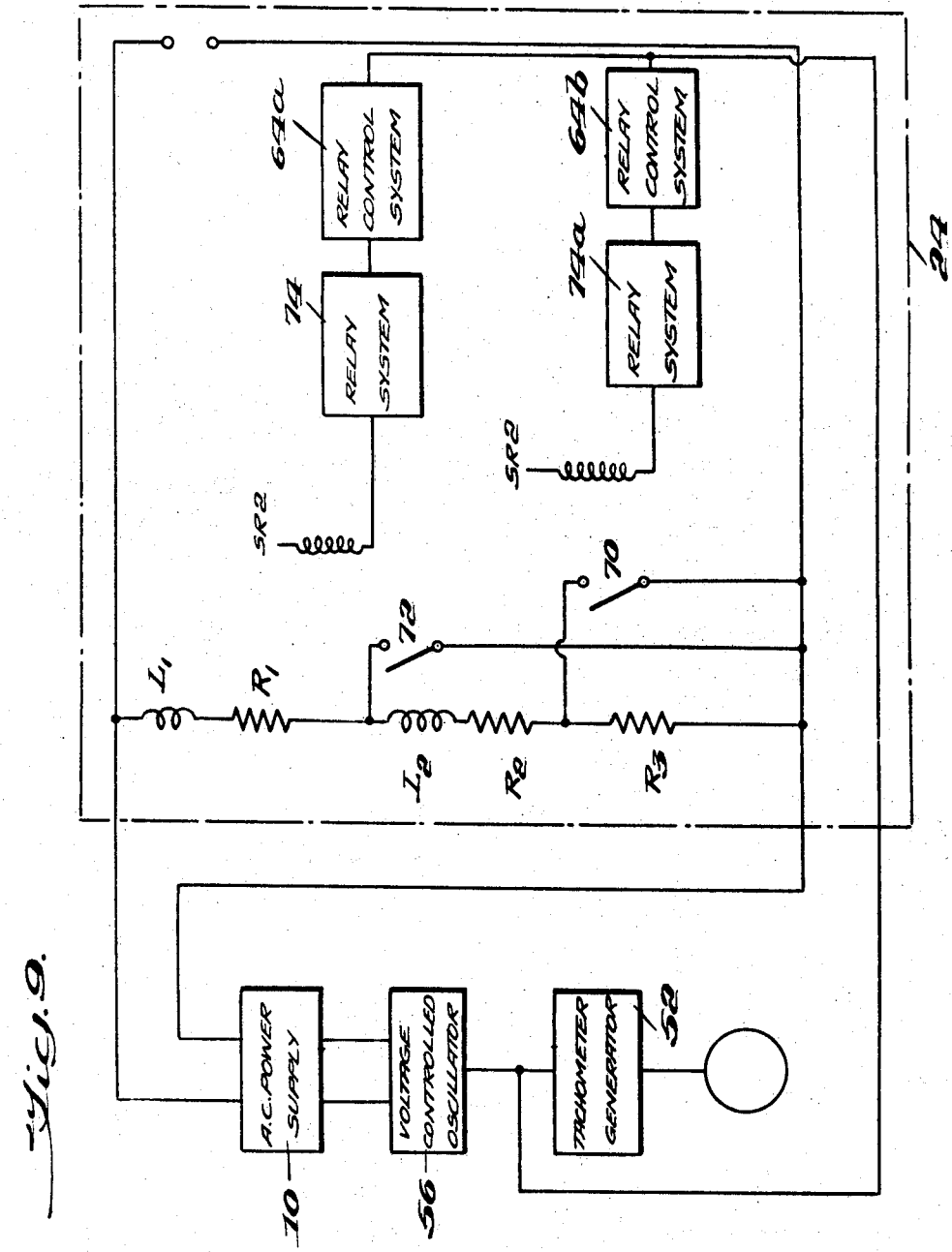

United States Patent Office 3,385,951
Patented May 28, 1968

3,385,951
APPARATUS FOR PERFORATING AND BONDING MOVING SHEETS OF MATERIAL BY ELECTRICAL DISCHARGES
Lewis Clinton Bancroft and William Allan Cook, Wilmington, Del., assignors to E. I. du Pont de Nemours and Company, Wilmington, Del., a corporation of Delaware
Filed May 20, 1966, Ser. No. 551,621
10 Claims. (Cl. 219—384)

The present invention relates to perforating and/or bonding sheet material and more particularly to improvements in apparatus for perforating and/or bonding sheet materials by means of simultaneous multiple electric arc discharges.

It has been proposed to perforate sheet material by passing the sheet between fixed parallel electrodes having a current limiting individual impedance and a fixed base electrode which cause simultaneous multiple electric arc discharges. The process variables of commercial concern are the duration of the arc, energy of the arc, spacing between successive perforations at the same electrode, the shape of the perforations and the speed of travel of the sheet. The prior art proposal offers very little control of these variables. In addition construction of commercial apparatus would be difficult using resistive impedance or conventional capacitors.

Accordingly, the objective of this invention is to provide means for perforating and/or bonding a moving sheet of material with perforations of predetermined size and shape in a predetermined pattern over a wide range of sheet speeds.

Other objectives and advantages of the invention will be apparent as the description proceeds.

With these objectives in view, the apparatus for the perforation and/or bonding of a moving sheet by simultaneous multiple electric arc discharges as provided herein includes:

(I) A fixed plate electrode of arcuate shape;

(II) A plurality of pin electrodes connected in parallel each with an individual impedance adapted to rotate in a path concentric to the fixed plate (preferably the impedance being a current limiting series capacitance integral with the electrode);

(III) Means for advancing the sheet between the electrodes in the direction of movement of and at the same velocity as that of the pin electrodes;

(IV) A source of A.C. power at a high voltage and adjustable frequency for the electrodes; and (V) Means for regulating and maintaining the size of the perforations within predetermined limits by correspondingly altering the frequency of the power source as the sheet velocity is changed.

Means of carrying out the present invention are described, by way of example, with reference to the accompanying drawings in which:

FIGURE 1 is a side elevation of the electrode system with a block diagram of the remainder of the circuit;

FIGURE 6 is a schematic wiring diagram showing an embodiment of a frequency regulation system and a power cut-off means;

FIGURE 7 is a graphical illustration in which frequency is represented as a function of sheet velocity;

FIGURE 8 is a schematic wiring diagram showing a relay control system; and

FIGURE 9 is a schematic wiring diagram showing means for correcting the power factor.

Figure 2:
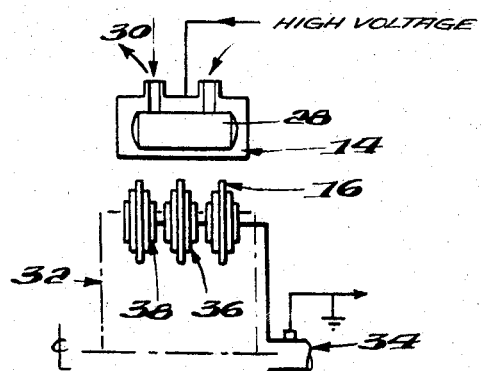
FIGURE 2 is a section of one embodiment of the electrode system corresponding to the line 2—2 of FIGURE 1.

Referring now to the drawings in detail, a circuit and electrode system is shown in FIGURE 1. The basic system consists of a high voltage A.C. power source 10 having an adjustable frequency, a frequency regulation system 12, and fixed plate electrode of arcuate shape 14, pin electrodes 16 rotating about a common center in a path concentric to plate 14, each having a separate capacitance 18 and connected in parallel to one side of the power source. A web of sheet material 20 is conducted over and held in place with the electrode assembly by rolls 22. Means are provided for advancing the sheet at the same velocity as the pins so that a given pin stays in register with the same position on the sheet while the arc discharge is occurring between the fixed electrode and the pin electrodes. An optional power factor corrector 24 and power cut-off 26 means are shown.

FIGURE 2 shows one embodiment of the electrode assembly in section. The fixed plate electrode 14 is hollow 28 and has openings 30 for a cooling medium. The pin electrodes 16 are located in rows along the periphery of a drum 32 and connected in parallel to a slip ring 34 for the power connection. Each electrode has an integral capacitor afforded by a dielectric material 36 and a surrounding metal band 38.

While any type current limiting impedance theoretically works, capacitive impedance is preferred for several reasons. A resistive impedance dissipates large amounts of power which is wasteful and heat producing. Inductive impedance is expensive and its bulkiness creates problems with the space limitations of the apparatus.

Figure 3:
FIGURE 3 is a sectional view of a pin electrode with an integral capacitor.

FIGURE 3 is a section in elevation of a single-ended pin electrode with an integral capacitor. Metal pin 16, which can be made of tungsten for example, is located within hollow cylinder or casing 36 of a ceramic such as alumina. The pin 16 is fixed firmly into the cylinder 36 by metallizing 40 the inside diameter of 36 and soldering or brazing. The outer cylindrical surface of the ceramic 36 is metallized 40 with a conductive coating to provide a capacitive coupling to the pin 16 through the dielectric material 36 of the ceramic. The length of the outer coating is selected to give the desired capacitance.

Figure 4:
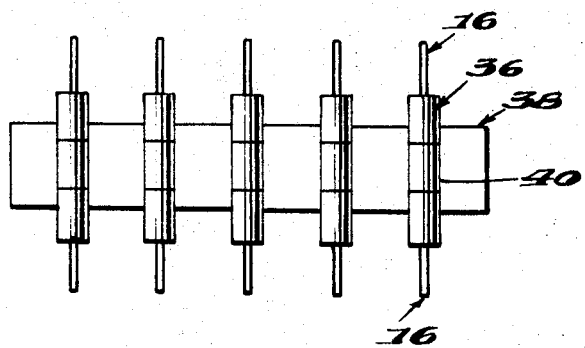
FIGURE 4 is a side elevation of a pin electrode assembly.
Figure 5A:
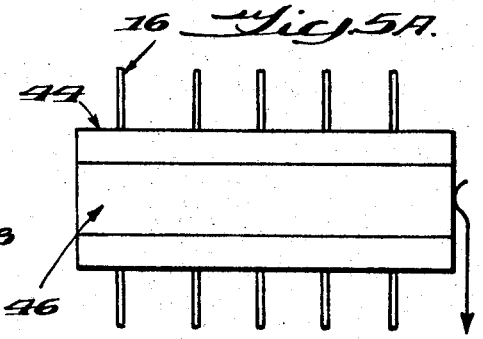
FIGURES 5A and 5B are a side elevation and a plan view respectively of an alternate embodiment for the pin electrode assembly.
Figure 5:
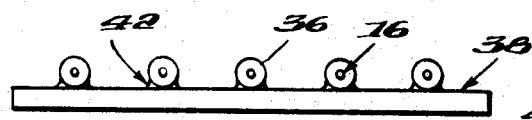
FIGURE 5 is a plan view of FIGURE 4.

FIGURES 4 and 5 show a side elevation and plan view, respectively, of an assembly of pin electrodes. The ceramic cylinders 36 are fixed to a metallic support bar 38 by soldering or brazing 42 the metallized length 40 of the cylinder 36 to the bar 38, for example. Bar 38 serves to support the assembly in the apparatus and complete the electrical circuit back through the slip ring as shown in FIGURE 2. The pin electrodes 16 in this case are double ended so that the assembly can be reversed in the drum thereby allowing longer useful life as pin erosion occurs.

Figure 5B:
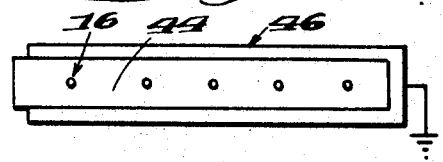
Figure 5C:
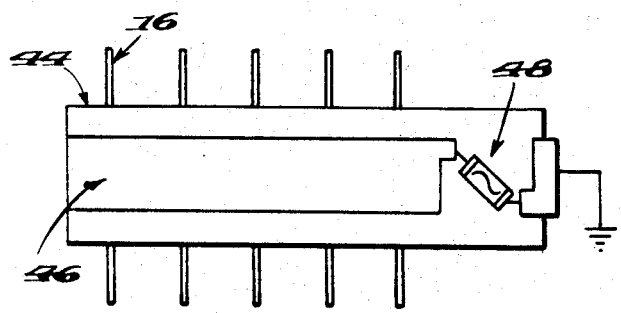
FIGURE 5C shows an additional feature of the alternate embodiment of FIGURE 5A.

FIGURE 5A and 5B shows a side elevation and plan view, respectively, of an alternate construction technique for the pin electrode assembly. Pin 16 is molded into a suitable plastic dielectric material 44 which also serves as a structural support for the entire assembly. Individual current limiting series capacitance coupling to each pin is achieved by applying a conductive metallic strip 46, for example, aluminum foil tape, on the faces of the plastic dielectric. Width of the tape 46 is adjusted to provide the desired amount of capacitance. The conductive tape is extended back to contact the drum 32. The circuit is completed back to the power supply through the slip ring. FIGURE 5C shows an additional feature added to the pin electrode assembly to make system operation more practical. The conductive strip 46 on the faces of the dielectric is interrupted and a fuse element 48 is inserted in the current path. If an electrical failure occurs in the dielectric material 44 of the capacitive current limiter, the surge current will cause the fuse 48 to open thereby electrically removing the individual pin assembly from the drum. The remainder of the system will then continue to operate normally with only the loss of one row of holes for each revolution of the drum.

The size of a perforation, whether only perforating or also bonding, in a given sheet by an electric arc is directly related to the energy W of the arc which can be expressed by the equation:

$$W = iEt$$

where $i$ is the mean value of the current of arc, E is the voltage across the arc and $t$ is the time that a spot on the sheet is exposed to the arc. The time $t$ is inversely related to the velocity of the sheet for a given length of fixed plate electrode. The current of the A.C. arc is directly related to the frequency of the current in a capacitive circuit. If the frequency is changed directly and linearly with the velocity of the sheet then the current of the arc changes substantially linearly and directly with the velocity of the sheet. Under these conditions the energy of arcing for each perforation is maintained substantially constant at various sheet velocities, typically from one to 500 yards per minute.

While only perforating is often desired (e.g., to increase air porosity of various materials) bonding is often additionally desired to laminate layers of material. Thus, when laminating fibrous thermoplastic materials for example, the arc not only perforates the material, but its heat fuses the fiber ends together. When bonding is desired, the variables additionally controlled are total energy input per hole and the rate of energy input. If the rate is too low, hole size is too small and arc efficiency of heating is reduced. If the rate of energy input is too high, heat is released on the arc perforation so fast that the holes' edges are "exploded" and no fusing occurs. The various values, of course, will depend on the size apparatus employed. With the apparatus described in the example to follow about 50 milliseconds is the minimum time necessary to create a nominal .030 inch diameter hole and achieve adequate bonding. For bonding, this apparatus is particularly suitable for bonding thin, fibrous thermoplastic materials of low dielectric strength. For strictly perforating applications of course, even paper or paper-like webs could be perforated.

As for some of the other variables, duration of the arc, for perforating and/or bonding, is determined by the shoe size (plate electrode) and the web speed. Spacing between perforations is set by the mechanical positions of the individual electrode pins. The minimum spacing between the plate and pin electrodes is determined by the thickness of the web, additional mechanical clearance between the web and the plate electrode to prevent jamming or fouling, etc. Maximum spacing is limited by the fact that unnecessary spacing requires increased voltage to break down the air gap which increases chances of misfires, crossfiring and non-uniform spacing due to wandering of the spark.

FIGURE 6 gives a schematic diagram of the automatic frequency regulation system 12 and an automatic power switch 26. A device 50 such as a friction wheel senses the velocity of the sheet, the rollers or the electrode drum and transmits this by suitable linkage to drive a D.C. generator which serves as a tachometer 52. The D.C. voltage from the generator (having a magnitude which is directly proportional to the velocity of the sheet) is divided by potentiometer $R_1$ to the desired level and thence through diode 54 to a voltage controlled oscillator 56 with an output whose frequency varies directly and linearly with the input voltage (typically 2 kilocycles/sec. to 50 kilocycles/sec.). The high frequency output of the oscillator is fed to a linear amplifier 10 (typically a vacuum tube unit having 5 to 20 kva. output) and the amplifier high voltage output to the electrode system. The frequency of the amplifier output varies linearly with the velocity of the sheet 20. The potentiometer $R_1$ provides an adjustment of the slope of the curve of power frequency versus sheet velocity. Since the energy available for each perforation is a function of frequency and web speed, and hole size is a function of available energy, adjustment of the potentiometer $R_1$ will allow adjustment of the hole size or compensation for changes in web thickness.

It has been found that for a given circuit as the sheet velocity decreases to B in FIGURE 7 and the frequency decreases below a certain value A the efficiency of the arc decreases so that a given size perforation is produced even at infinite time. The resistance $R_2$ and the source of D.C. voltage $S_v$ (See FIGURE 6) is adjusted to provide a minimum signal A through the diode 58 to the oscillator 56 to prevent the oscillator from going to its minimum frequency. As the sheet velocity increases the voltage across $R_1$ and 54 exceeds the voltage across $R_2$ and 58 thereby blocking the current through 58 and the tachometer 52 assumes control of the oscillator 56. This technique allows the use of a lower cost amplifier 10 since in the example, the amplifier need be linear over a 25:1 range (50 kilocycles to 2 kilocycles), while the operating range of bonding speeds is 500:1 (500 yards/minute to 1 yard/minute).

FIGURE 6 shows meters 60 and 62 which may be calibrated in sheet velocity and frequency (of the oscillator) conveniently for commercial production.

Block 26 in FIGURE 6 shows a diagram of a power cut-off system which is of value in continuous automatic operation of the basic apparatus. Voltage from the tachometer generator 52 is fed to the relay control system 64 to close switch 66 (when the sheet velocity falls below a set level) and cut off the power supply by short-circuiting the oscillator 56. The system opens switch 66 when the sheet velocity attains a preselected value after starting from a stop.

FIGURE 8 shows a schematic diagram of one typical embodiment of the relay control system 64. The voltage of the tachometer 52 output is compared to a preset voltage from a source $S_v$ and potentiometer $R_5$ in a discriminator circuit 68 (such as a Schmitt trigger) so that when the sheet velocity goes below a minimum, switch 66 is closed by current from source $SR_3$ so that the output of the oscillator 56 is short circuited.

FIGURE 9 shows a further modification of the basic apparatus with provision for a power factor corrector 24 to improve the utilization of the power source by automatically maintaining the power factor of the load seen by the power source within practical limits by switching appropriate impedances across the discharge load at predetermined frequencies. This is desirable since the capacitor limiter-discharge load presents a low power factor load to the amplifier with a considerable capacitive component.

Load correction is accomplished by shunting the power supply output with an inductor to draw a compensating lagging current. In the embodiment shown in FIGURE 9 the ideal correction is approximated by switching inductors $L_1$ and $L_2$ and resistors $R_1$, $R_2$ and $R_3$ sequentially into the circuit at appropriate frequencies using relays 70 and 72. Switching at a preselected frequency is accomplished as follows: A D.C. signal is taken from the slope control network (FIGURE 6) at the point it enters the input of the voltage controlled oscillator 56. The D.C. level at this point is proportional to frequency. This signal is fed into relay control systems 64a and 64b. The internal arrangement of 64a and 64b is similar to FIGURE 8. A preset adjustable voltage from potentiometer $R_5$ is compared with the input D.C. level by a discriminator (Schmitt trigger). When the two voltages are equal, the discriminator circuit changes mode and the resulting output activates the relay. Optimum preset switching frequencies will be determined by the circuit parameters and the size of power supply. Perfect power factor correction with a given inductance coil combination will occur at only one frequency. Above this frequency, the power supply will "see" a capacitive load; below it, an inductive load. When the error becomes too large as frequency is shifted, a new inductance combination is switched in by the relay control system as described above.

The circuit of box 64 of FIGURE 8 can be used for relay control systems 64a and 64b.

When the sheet is moving at a velocity of from zero to about ⅓ of its maximum, all of the corrective elements ($L_1$ $L_2$, $R_1$, $R_2$ and $R_3$) are in the circuit. $R_3$ is a large value resistor (typically 360 ohms as compared with 240 and 60 ohms respectively for $R_1$ and $R_2$) to limit low frequency current. The sum of $R_1$, $R_2$ and $R_3$ predominates at frequencies where power factor correction is not required (e.g. below about 15 kc.–20 kc.).

The voltage from source $S_v$ and potentiometer $R_5$ is adjusted to equal the voltage of the tachometer 52 at a sheet velocity of about ⅓ the maximum. At this speed the discriminator circuit 68 permits current to a relay system 74a which can for example include an amplifier to a switching device to close switch 70 and short $R_3$. The combined values of the remaining corrective elements is thus made more inductive.

When the sheet velocity attains about ⅔ of its maximum the increased voltage of the tachometer is used to close switch 72 by means of another discriminator circuit 68, preset comparison voltage from a source $S_v'$ and potentiometer $R_5'$ in conjunction with a relay system 74 and switching means 72. $R_2$ provides for energy dissipation from $L_2$. The values of $L_1$ and $L_2$ are chosen so that, at the mid-point of each step, the inductive current is approximately equal to the capacitive load current.

The following is an example of a typical bonding application using the apparatus of this invention.

EXAMPLE

A nonwoven sheet of randomly disposed continuous filaments of an isotactic polypropylene polymer that are bonded at crossover points and having a thickness of about 0.64 mm. as made by the process of British Patent 932,482 is used. One edge of the sheet is continuously and automatically perforated using the apparatus of FIGS. 2, 4, 6 and 9 at sheet velocities of from about one to 500 yards (467 meters) per minute. Details of the process follow:

A.C. power source—3000 volts at 2–50 kc. frequency
Fixed plate electrode—38 cm. in length
Integral capacitance of pin electrode—approximately 11 micromicrofarads
Electrode assembly—lines of 9 pins of 1.25 mm. tungsten with a 60° included angle and a chamfered point on the tip located around the drum to give a square pattern on the surface at center-to-center distances of 0.165 inch (4.2 mm.)
Spark gap—0.89 mm.
Inductance $L_1$—about 1.8 mh.
Inductance $L_2$—about 2.5 mh.

The perforations of about 0.8 mm. in diameter are uniformly placed in the sheet with a melted and bonded ring about each perforation so that they serve as an extremely strong and uniform selvage for the material.

It is to be understood that the foregoing drawings and description are by way of example only and that various modifications and changes may be made by those skilled in the art without departing from the spirit of the invention and the scope of the appended claims.

What is claimed is:

1. Apparatus adapted to perforate and bond moving sheets by simultaneous, multiple electric arc discharges comprising:
   (A) a fixed plate electrode having an arcuate shape;
   (B) a plurality of pin electrodes, each having an individual impedance, connected in parallel and adapted to rotate in a path concentric to and in close proximity to said fixed plate electrode;
   (C) means for advancing a sheet between said plate and pin electrodes in the direction of rotation of and at the same velocity as said pin electrodes;
   (D) an A.C. power source of high voltage and adjustable frequency for said plate and pin electrodes to provide simultaneous, multiple arc discharges between said plate and pin electrodes; and
   (E) means for regulating and maintaining the size of said perforations within predetermined limits by correspondingly altering the frequency of said power source as the velocity of said sheet and pin electrodes is changed.

2. The apparatus of claim 1 wherein the fixed plate electrode is hollow to provide for a cooling medium.

3. The apparatus of claim 1 wherein each pin electrode is provided with an individual current limiting series capacitance integral therewith.

4. The apparatus of claim 3 wherein each of said pin electrodes comprise a metal pin having a ceramic dielectric casing, and wherein the outer surface of said ceramic has a conductive coating to provide a capacitive coupling to said pin through said dielectric material.

5. The apparatus of claim 3 wherein said pin electrodes are mounted in transverse rows about the periphery of a rotatable drum.

6. The apparatus of claim 3 wherein said means for regulating the size of said perforations comprises (1) sensing means for sensing the velocity of said sheet and pin electrodes, and (2) control means operably connected to be responsive to said sensing means and operably connected to adjust the adjustable output frequency of said A.C. power source proportional to said sheet velocity.

7. The apparatus of claim 6 wherein said sensing means comprises a tachometer generator.

8. The apparatus of claim 6 wherein said control means comprising a potentiometer for dividing the voltage from said sensing means to the desired level, a voltage controlled oscillator with an output whose frequency varies directly and linearly with the input voltage, and a linear amplifier whose frequency varies linearly with the velocity of said sheet.

9. The apparatus of claim 6 further comprising power cut-off means operably connected between said sensing means and power source to be responsive to the voltage from said sensing means to (1) cut off said power supply when the sheet velocity falls below a predetermined set level; and (2) activate said power supply when the sheet velocity attains said predetermined set level.

10. The apparatus of claim 1 further comprising:
   (F) means for automatically maintaining the power factor of the load as seen by said power source within predetermined practical limits by switching appropriate impedances across the discharge load of said fixed plate electrode and pin electrodes at predetermined frequencies.

References Cited

UNITED STATES PATENTS

| | | | |
|---|---|---|---|
| 2,141,869 | 12/1938 | Konig | 175—265 |
| 2,551,466 | 5/1951 | Salmon-Legagneur et al. | 346—74 |
| 2,982,186 | 5/1961 | McKeen | 93—1 |
| 3,017,486 | 1/1962 | Kogan et al. | 219—383 |
| 3,098,143 | 7/1963 | Warmt | 219—384 |

FOREIGN PATENTS 461,214    11/1949    Canada.

RICHARD M. WOOD, *Primary Examiner.*

V. Y. MAYEWSKY, *Assistant Examiner.*